United States Patent [19]

Ifrim et al.

[11] Patent Number: 5,632,705
[45] Date of Patent: May 27, 1997

[54] EPICYCLIC ROLLER GEAR INCLUDING TWO RINGS HAVING AN INTERNAL PROFILE AND A ROLLING ELEMENT CAPABLE OF ROLLING ON THE INNER SIDE OF THE RINGS

[75] Inventors: Vasile Ifrim; Annedore Ifrim, both of Kehl/Rhein, Germany

[73] Assignee: Neugart GmbH & Co., Kippenheim, Germany

[21] Appl. No.: 428,208

[22] PCT Filed: Nov. 11, 1993

[86] PCT No.: PCT/EP93/03163

§ 371 Date: May 17, 1995

§ 102(e) Date: May 17, 1995

[87] PCT Pub. No.: WO94/11651

PCT Pub. Date: May 26, 1994

[30] Foreign Application Priority Data

Nov. 17, 1992 [DE] Germany .................. 42 38 788.4

[51] Int. Cl.⁶ .................................... F16H 57/08
[52] U.S. Cl. ............................. 475/341; 475/342
[58] Field of Search .................. 475/341, 317, 475/338, 342, 176, 179

[56] References Cited

U.S. PATENT DOCUMENTS

| 1,795,996 | 3/1931 | Büttner | 475/117 |
| 2,802,377 | 8/1957 | Berthiez | 74/801 |
| 3,453,907 | 7/1969 | Noguchi et al. | 475/341 |
| 4,799,396 | 1/1989 | Ito | 74/801 |

FOREIGN PATENT DOCUMENTS

| 0921199 | 4/1947 | France . |
| 3819756 | 12/1989 | Germany . |
| 60-249768 | 5/1984 | Japan . |
| 0446845 | 3/1968 | Switzerland . |
| 0332501 | 8/1930 | United Kingdom . |

*Primary Examiner*—Charles A. Mamor
*Assistant Examiner*—Sherry Lynn Estremsky
*Attorney, Agent, or Firm*—Panitch Schwarze Jacobs & Nadel, P.C.

[57] ABSTRACT

An epicyclic roller gear (100) has two rings (1 and 4) provided with an inner profile. One ring (1) is fixed and the other ring (4) is parallel or coaxial to the first ring (1) and is rotatably mounted with respect thereto. The number of teeth on the two rings is different. Both rings (1 and 4) have at least two parallel internal profiles (1.1, 1.2, 4.1 and 4.2) which are offset in the circumferential direction by a fraction of the pitch of the profile or teeth. When each ring has two mutually offset internal profiles, they are mutually offset by half the pitch of the teeth, so that in this case the gaps of the one tooth system are occupied by the teeth of the second, adjacent tooth system. This results in a high contact ratio with the corresponding complementary profiles of a rolling element, preferably a roller carrier (5) with rotatable rollers which roll in the gaps between the teeth of the internal profiles. Because the rings have a different number of teeth, there results a relative rotation during each revolution of the rolling element. By providing sections having a different number of teeth and/or teeth of different shapes in the circumferential direction, the output speed can be varied, and if required the output may even be stopped for a short time or its direction of rotation may be reversed. This in turn may be used to convert, through the gear (100), a reciprocal movement acting on such a ring into a rotary motion in a single direction (FIG. 2).

23 Claims, 5 Drawing Sheets

EPICYCLIC ROLLER GEAR INCLUDING TWO RINGS HAVING AN INTERNAL PROFILE AND A ROLLING ELEMENT CAPABLE OF ROLLING ON THE INNER SIDE OF THE RINGS

FIELD OF THE INVENTION

The invention relates to an epicyclic roller gear with two rings having an internal profile or internal tooth system, wherein a first ring is fixed and a second ring is parallel or coaxial to the first ring and is rotatably mounted with respect thereto and the number of teeth on the internal profile of the two rings is different, further with at least one rotatable rolling element which is capable of rolling on the profiled inner side of the rings and has alternate external gaps and projections which mesh with the internal profiles or internal tooth systems of both rings, wherein the rolling element is rotatably mounted on an arm or the like which is rotatable about an axis or a shaft arranged in the centre of the rings and thereby drives the rolling element in the circumferential direction along the inner sides of the rings, so that on account of the different numbers of teeth on the inner side of the two rings the rotatable ring is movable relative to the fixed ring.

BACKGROUND OF THE INVENTION

Such epicyclic roller gears with a rolling element are known. Above all high transmission ratios can thereby be provided. A drawback in this connection is however that the projections of the rolling element do not have any restraint with respect to the internal profile of the rings, but additional measures have to be taken in order that no backlash or freewheeling occurs within the gear, for instance during reversal of load. A zero-backlash power transmission cannot be attained. The endeavour is therefore made to eliminate these drawbacks by so-called biased gearwheels. However the production costs are thereby increased and the power transmission is affected.

It is furthermore known to produce zero backlash by elastic cages or flexible materials of the component parts, through which however the transmissible forces are limited and higher friction occurs, reducing the efficiency.

The object underlying the invention is therefore to provide a gear of the kind mentioned at the outset, permitting high reduction ratios to be achieved, but at the same time attaining a high efficiency and compulsory zero backlash.

SUMMARY OF THE INVENTION

This object is accomplished in an epicyclic roller gear with two rings each having an internal profile or internal tooth system of the kind mentioned at the outset in that each of the two rings has at least two internal profiles or internal tooth systems which are disposed parallel to each other and are arranged so as to be mutually twisted or offset in the circumferential direction by a fraction of the pitch of the profile or teeth, wherein the internal profiles or internal tooth systems of one ring conform, but the internal profiles or internal tooth systems of the two rings differ from one another, that axially adjacent, complementary profiles with gaps and projections are arranged on the rolling element and correspond in number to the internal profiles or internal tooth systems of the rings, said complementary profiles being mutually offset in the circumferential direction according to the offset of the internal profiles or internal tooth systems on the rings, and that the projection of the rolling element engaging the one internal profile or internal tooth system of a ring is applied in the forward direction and the projection simultaneously engaging the adjacent internal profile or internal tooth system of the same ring is applied in the opposite direction and as the rolling element rolls this engagement of the projections thereof alternates continuously.

The use of in each case at least two internal profiles slightly mutually offset in the circumferential direction, together with the rolling element and the projections likewise offset on it, results in an improved contact ratio of the co-operating profiles and projections and in addition there is zero backlash at each ring from the outset. This is the case especially since at least two projections are always simultaneously in engagement and are arranged relative to each other in such a way that it is not possible for the rolling element to advance or lag behind relative to the associated ring even in case of a short-term overtaking movement or the like. Hence zero backlash is attained without implementing springs or elastic members or other measures detracting from the efficiency. This enables the gear to run smoothly and with good efficiency. On account of the fixed ring having a number of teeth different from that of the rotatable ring, the relative rotation known per se of the rotatable ring ensues as the rolling element rolls along the internal circumference of the profile or tooth system. Since two projections of the rolling element simultaneously engage each ring, a good contact ratio results, enabling the rolling element to be produced with a correspondingly small diameter so that the external dimension of the gear as a whole can also be kept small.

It is particularly advantageous if, when using two rings each having two internal profiles or internal tooth systems arranged parallel to each other, the latter be mutually offset in the circumferential direction by half the pitch of the profile or teeth. Rings with in each case two mutually offset internal profiles can be manufactured at a relatively reasonable price, for instance from two subsequently assembled ring members, and simultaneously have the above-mentioned advantages of operating with zero backlash and with high efficiency, while being of a comparatively small external dimension.

A development of considerable importance in the invention, improving the smooth running and efficiency of the gear and permitting zero backlash operation, may consist in that the rolling element is a rotatably mounted roller carrier circumferentially provided with individual rotatable rollers as projections for engagement with the internal tooth systems of the rings, that the individual rollers on the roller carrier are offset in the circumferential direction on the roller carrier according to the offset of the internal profiles or internal tooth systems on the rings and are arranged in such a way that suitably arranged rollers cooperate or mesh with each internal profile or internal tooth system of the rings, and that the roller engaging the one internal profile or internal tooth system of a ring is applied in the forward direction and the roller simultaneously engaging the adjacent internal profile or internal tooth system of the same ring is applied in the opposite direction and as the roller carrier rotates and revolves they move on rolling contact in such a way that this engagement of the rollers alternates continuously.

By means of the projections in the form of rollers, the friction during the rolling motion of the rolling element is further reduced and at the same time a good non-positive connection is attained in which the rollers bearing oppositely against the internal profiles of a ring bring about the compulsory zero backlash. Therefore a very high efficiency is at the same time attained with this zero backlash, since the rollers can smoothly roll along the surfaces of the teeth or profiles of the internal profile or internal tooth system of the ring.

The internal profile or internal tooth system between the individual teeth has an arcuate contour with a smooth transition to the tooth surfaces, and during the revolution of the roller carrier the rollers can roll continuously in the space between two teeth of the internal profile of the ring and then enter the respective, neighbouring interspace. Therefore smooth rolling with correspondingly good efficiency of the gear results.

Altogether it is hence achieved that the projections or rollers simultaneously engaging the internal tooth systems or internal profiles of the respective ring are offset in such a way that the engagement of the rolling element or roller carrier with the respective ring is compulsorily free from backlash. Spring elements, elastic gear members and the like can be avoided.

For a good zero-backlash, shock-free power transmission and transmission ratio the roller carrier may be provided with at least two, three or four equi-circumferential projections or rollers for each internal profile or internal tooth system and the roller carrier can therefore have altogether at least eight, twelve or sixteen rollers. If, for instance, four such rollers with interspaces for co-operating with the teeth of the internal profile of the rings are provided in each of the transmitting diametral planes of the roller carrier, hence if such a roller is arranged only every 90°, nevertheless a high contact ratio between the roller carrier and the internal tooth system results on the basis of the offset of the inner profile on the ring and the corresponding, simultaneous engagement by the rollers of adjacent radial planes. Therefore the roller carrier can have a relatively small outside diameter and nevertheless enable a good power transmission.

It is advantageous for the power transmission if the arm is provided with at least two, preferably diametrally opposed, rotatably mounted roller carriers of identical size and shape or three roller carriers evenly distributed on the inner circumference of the rings. The torque transmitted from a shaft to the roller carriers is therefore evenly distributed.

In an epicyclic roller gear with two rings each having two internal profiles mutually offset in the circumferential direction, the roller carrier may be provided with altogether four axially adjacent sets of rollers, wherein the rollers meshing with an internal profile or internal tooth system are evenly distributed at the circumference of the respective roller carrier, the rollers mutually offset in the circumferential direction for co-operating with the one ring and those for co-operating with the other ring in each case being arranged coaxially and having a corresponding offset in the circumferential direction of the roller carrier. The rollers of a first internal tooth system of the one ring are hence coaxial to rollers for co-operating with a first internal tooth system of the second ring, while for co-operating with the offset internal profiles of these two rings the rollers are again offset in the same way and are likewise coaxially arranged. It is thereby ensured that the revolution of the roller carrier turns the rotatable ring with high reduction on the basis of the latter having a different number of teeth from the fixed ring.

The rollers which are arranged at a corresponding location on the circumference of the roller carrier and serve for co-operating with in each case one internal profile or internal tooth system of the two rings may be arranged on a continuous axis and all the axes carrying the rollers mutually offset in the circumferential direction may be provided continuously in the axial direction on the roller carrier, each second axis carrying the respective rollers offset. Upstanding collars or the like may be provided between the individual rollers on the roller carrier and serve to separate the rollers from one another and to support the continuous axes. Hence all in all a roller carrier is produced having equi-circumferential axes, a roller carrier with four rollers in each individual plane having altogether eight such axes. This leads to a structurally simple solution which also lends itself to simple manufacture, because the bores for receiving the axes can be simply made as through bores and the axes can be inserted and fixed as continuous pins.

The rotatably mounted ring can be connected to an output shaft arranged in alignment with the input shaft, such connection being established by way of a disc or bell, particularly one connected to the end face and/or exterior of said ring. In this manner there results a coaxial arrangement of input and output shaft and nevertheless a high reduction therebetween.

Drive and output may be interchanged to increase the speed. This is possible because on account of the zero backlash and high efficiency, the gear can operate smoothly and without irreversibility.

Particularly if the above-described features and measures are combined singly or severally, an epicyclic roller gear ensues with two internally profiled rings, a shaft and connected thereto a roller carrier fitted with rolling elements or rollers, wherein the internally profiled rings in each case have at least two adjacent profile planes and the roller carrier has at least four roller planes rotatable about a common shaft, and wherein the profiles of the rings are formed in such a way as to produce a momentary form-fit with in each case a least one roller of the roller plane having no less than two rollers per plane. This form-fit in two roller planes at a time produces the wanted zero backlash without any further measures being taken, and the use of rollers on an appropriately profiled internal tooth system nevertheless produces a smooth-running rotatability.

Instead of a direct drive of the roller carrier(s) by way of a shaft acting upon the arm for support of the roller carriers, the shaft rotatable with the roller carrier(s) can have or carry external profiles formed in such a way that each produces a momentary form-fit with one roller of the roller carrier in at least two roller planes. By this means the reduction can be increased, because the profile on the input shaft in co-operating with the roller carriers represents an additional reduction stage.

It is particularly advantageous if, on that side of the roller carrier(s) which faces the centre of the rings and is opposed to the rings and internal profiles thereof, the roller carrier(s) mesh with a rotary body having an external profile, particularly a tooth system, that the rotary body is non-rotatably or integrally connected to the input shaft and has a plurality of axially parallel, toothed rims, the axially adjacent teeth thereof being mutually offset in the circumferential direction by the amount to which the individual rollers and teeth of the internal profile of the rings are offset in the circumferential direction. Therefore the driving force is transmitted from this central rotary body at all the projections or rollers of the rolling element or roller carrier simultaneously, hence with an optimal contact ratio and distribution. Hence a zero-backlash power transmission from or to this central rotary body is enabled and on the basis of the good contact ratio the latter can have a relatively small outside diameter. Hence this additional stage causes no enlargement or no appreciable enlargement of the external dimension of the gear.

An especially important development of the epicyclic roller gear may consist in that the number of teeth and/or the shape of the teeth in the circumferential direction of at least one of the two rings and/or of the central rotary body changes over part of the circumference, so that more and/or differently shaped teeth are arranged in one section of the circumference than in one or more other sections. By this means it can be achieved that during a regular driving movement the output movement is irregular, i.e. takes place quicker and slower alternately or even stops for a time and/or even changes its direction. Therefore the gear can be used for stepping operations even if the drive runs continuously. This is achieved by the simple measure of changing the number of teeth and/or the curvature of the tooth surfaces. The respective, required contours of the tooth curves are known to the average person skilled in the art and can be calculated with the known laws of motion. Respective tooth patterns are known for linear or shock-free changes of movement. This arrangement can be realized particularly advantageously if the gear according to the invention is contemplated to have internal profiles offset in the circumferential direction on the rings, because this results in a zero-backlash mode of operation in which such changes in speed of the rotatable ring during a revolution can be made smoothly and with corresponding transitions.

The teeth in the axially adjacent planes on the drive element and/or rings may be formed in such a way as to have different profiles in sections of the same plane. This can be produced especially advantageously if to produce the rings they and/or the rotary body serving as the drive element are assembled from parallel discs or rings.

In order that the output can be stopped during a revolution, the profile or tooth system of the rings and/or of the central rotary body can be formed in such a way that the rings and/or the rotary body have the same profiles or shapes and/or spaces in certain circumferential or angular areas of different planes. If the internal profiles of the two rings correspond, no rotary motion occurs when the rolling element or roller carrier revolves. Hence the rotatable ring stops for a short time when the rolling element or roller carrier acts upon the circumferential or angular area having a profile corresponding to that of the other ring. In this way the output can be stopped as wanted for a short time, while the epicyclic roller gear according to the invention is being constantly driven. The changes in rotational speed of the rotatable ring can be effected jolt-free, because the gear according to the invention is free from backlash by using at least two, circumferentially offset, internal profiles on the ring which have a good contact ratio with the rolling element.

In order that the roller carrier can also be turned easily but at the same time permits simple manufacture, at least one shaft or axis may be provided for the rotatable mounting of the roller carrier on the arm.

When the above-described measures are combined singly or severally, an epicyclic roller gear results which is characterized in that between circumferential areas of the rings and/or of the central rotary body (if present) having different numbers of teeth and/or teeth of different shapes, the teeth and their spacing have a shape enabling a shock-free transition of the relative rotation, in that the transmission function of the transitions between the different profiles of the same plane have at least in the first derivative the value differing from zero, i.e. freedom from shock. With the aid of the transmission function, the appropriate numbers and shapes of the teeth can be calculated to enable a shock-free transition for changing rotating speeds.

A further development of the epicyclic roller gear according to the invention may consist in that a drive and/or an output is coupled to the exterior of the rotatable ring. Hence instead of connecting a central, coaxial shaft to this rotatable ring, a corresponding power transmission may be effected directly at that ring.

By way of example, a lever arm for application of a force and/or a tooth system or partial tooth system for co-operating with a complementary tooth system on a gearwheel or a rack or the like may be arranged on the outside of the rotatable ring, particularly at the outer circumference thereof. Therefore any further elements can be driven by the drive of the gear via the rotatable ring. Conversely a driving force can be introduced at the rotatable ring and is then converted into a rotary motion at the shaft connected to the rolling elements or roller carriers. If a circumferential, external tooth system is provided, the epicyclic roller gear can in turn be a stage in a gear mechanism.

However it is also possible for one or two working cylinders to be provided for acting on the external tooth system of the rotatable ring and on a rack or the like meshing therewith. Therefore reciprocations of these working cylinders can be transferred to the rotatable ring which performs corresponding partial turns. When an appropriately changing internal tooth system is used, these can nevertheless be converted into a unidirectional rotary motion at the shaft having the rolling elements or roller carriers. Therefore the epicyclic roller gear with a rotatable ring having numbers of teeth and/or teeth profiles changing in the circumferential direction permits a reciprocation to be converted into a rotary motion. Instead of working cylinders, provision may also be made for spindle drives or similar drives performing a linear movement convertible into a rotary motion in the manner outlined. Conversely, a rotary motion is convertible in this way into a reciprocation, if the drive is effected at the shaft having the rolling elements or roller carriers and the rotatable ring changes its direction of rotation as the rolling elements or roller carriers revolve, because one half of the internal profile of the rotatable ring has a larger number of teeth and the other half has a smaller number of teeth than the fixed ring.

To make use of wind power, for example, vanes mounted for rotation about an axis arranged approximately in radial relationship to the ring may be provided on one, two or more lever arms rigidly connected to the rotatable ring and in the one direction the vanes are arranged with their face crosswise to the diametral plane of the ring and after a turning point they are arranged approximately in that plane. In the one position they are exposed to the action of the wind and after reaching the turning point they twist in such a way that the wind hits the narrow side. Accordingly, a vane exposed to wind at the opposite side of the ring then causes the ring to turn back. On account of the different tooth systems at the internal profile of the ring, this reciprocation is converted into a rotary motion in a single direction, as was described above.

Altogether an epicyclic roller gear of high efficiency and small external dimensions is provided, which operates free from backlash and jerk-free, has a high contact ratio between rolling element or roller carrier and the rings, and allows advantageous developments with changing speeds and/or directions of rotation at the rotatable ring, particularly on account of the zero backlash. Oscillatory movements can be introduced and converted into a rotary motion or vice versa.

BRIEF DESCRIPTION OF THE DRAWINGS

Exemplary embodiments of the invention will be described in further detail below with reference to the drawings in which, partly in schematized form.

DETAILED DESCRIPTION OF THE PREFERRED EMBODIMENTS

Figure 1:
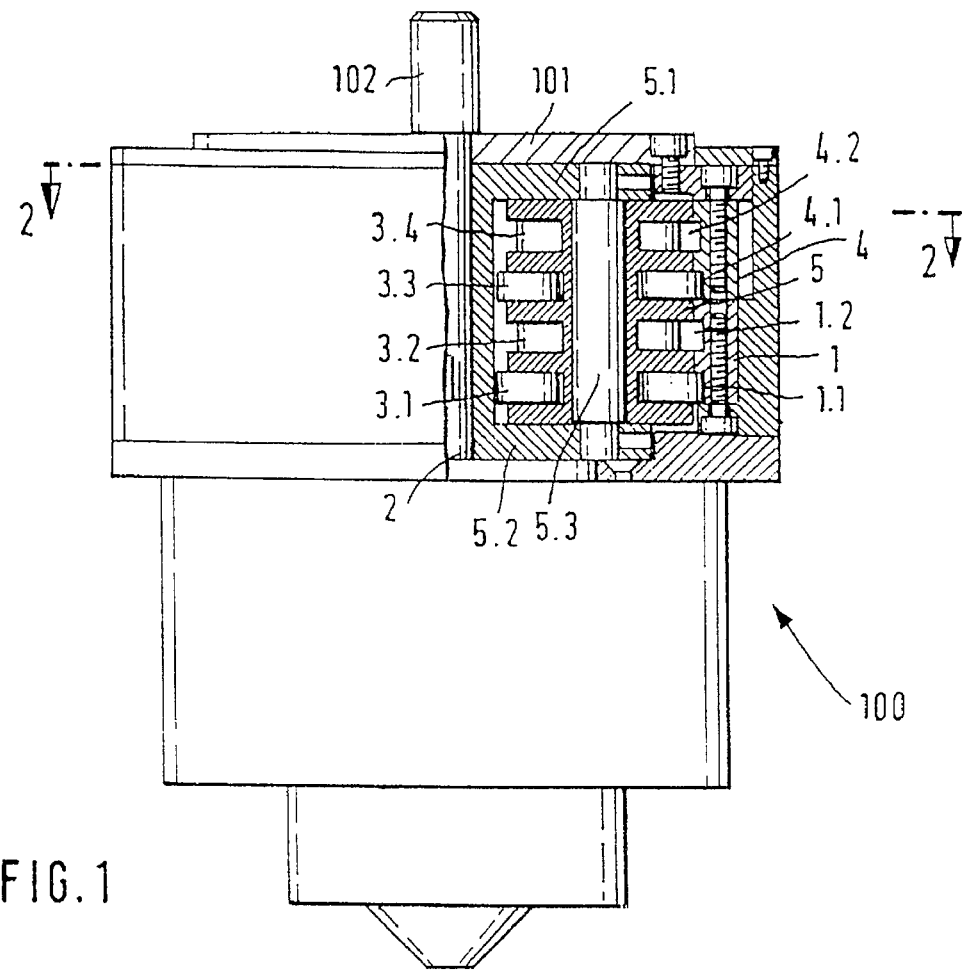
FIG. 1 is a side view, partly in longitudinal section, of an epicyclic roller gear according to the invention with drive, showing in section a roller carrier fitted with rollers and the portion of the rings acted upon by these rollers.

In the exemplary embodiments described below, tallying reference numerals will be accorded to tallying parts, even if they are of different design.

An epicyclic roller gear, generally designated 100 and hereinafter also referred to in short as "gear 100", has two rings 1 and 4 having an internal profile or internal tooth system. The internal profile or internal tooth system of the first fixed ring 1 is designated 1.1 and 1.2.

The second ring 4 is parallel and coaxial to the first ring 1 and its internal profiles are designated 4.1 and 4.2 in the drawing.

The number of teeth on the internal profile of the two rings 1 and 4 is different. This epicyclic roller gear 100 furthermore has at least one rotatable rolling element, in the exemplary embodiments two, which is capable of rolling on the profiled inner side of rings 1 and 4 and in the exemplary embodiments is a roller carrier 5 to be described in further detail below. This rolling element 5 has alternate, external gaps and projections, in the exemplary embodiments yet to be commented on said projections being rollers 3.1, 3.2, 3.3 and 3.4 in axially adjacent planes. The gaps between these projections in the form of rollers are the spaces existing between these rollers in the circumferential direction. These gaps and projections mesh with the internal profiles or internal tooth systems 1.1, 1.2, 4.1 and 4.2 of both rings 1 and 4.

The rolling element in the form of a roller carrier 5 is rotatably mounted on one, in the exemplary embodiment two, parallel and spaced arms 5.1 and 5.2 and is located therebetween. These arms are rotatable about an axis or shaft 2 arranged in the middle or centre of the rings 1 and 4, through which the rolling element(s) or roller carrier(s) 5 are driven in the circumferential direction along the inner sides of the rings 1 and 4, hence roll on the inner sides of the rings. Therefore, due to the different numbers of teeth on the inner sides of the two rings, the rotatable ring 4 is movable relative to the fixed ring 1.

Figure 9:
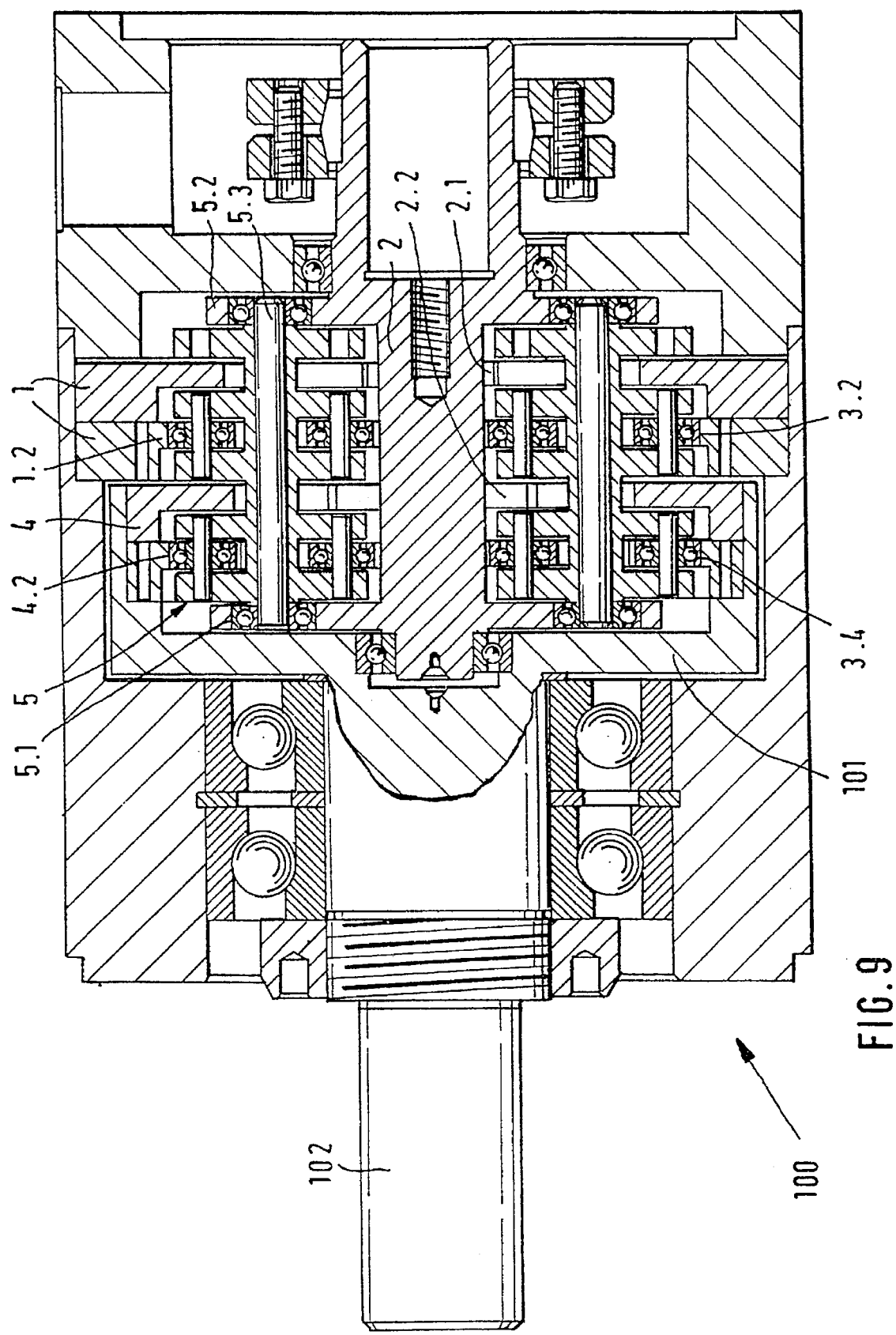
FIG. 9 is a longitudinal section of an epicyclic roller gear according to FIG. 1 with the mounting of drive, roller carriers, rollers and output, the drive motor proper being omitted for the sake of clarity.

Particularly in comparing FIGS. 1 and 2 or 3 and 4 and in the light of FIG. 9 one can see that in the exemplary embodiment each of the two rings 1 and 4 has two internal profiles, 1.1 and 1.2 on the one hand and 4.1 and 4.2 on the other hand, arranged parallel to each other in different, axially adjacent planes. The internal profiles take the form of internal tooth systems. They are arranged so as to be mutually offset or twisted in the circumferential direction by a fraction of the pitch of the profile or teeth, in the exemplary embodiment by half the pitch of the profile or teeth.

The internal profiles or internal tooth systems of one ring conform with respect to their shape as well as to their number of teeth. However the internal profiles or internal tooth systems of the two rings differ from one other particularly with respect to the number of teeth, in order to bring about the relative rotation already mentioned as the rolling element or roller carrier 5 revolves and as it rolls on these profiles.

Figure 2:
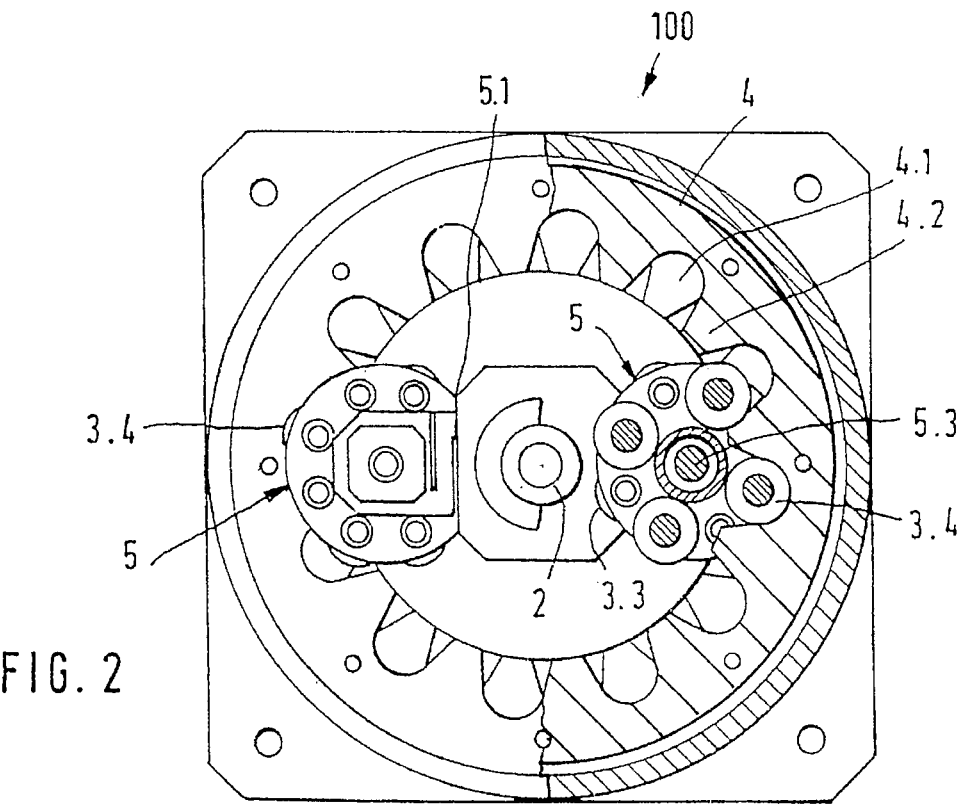
FIG. 2 is a partial cross section of the gear on the line 2—2 in FIG. 1, on the one hand with a front view of a roller carrier and on the other hand with a cross section of the diametrally opposed, second roller carrier, as well as with a view of one of the two internally profiled rings, the ring having two internal profiles or internal tooth systems mutually offset in the circumferential direction, wherein a drive shaft is non-rotatably connected to one or a plurality of arms presenting the roller carriers.

Axially adjacent, complementary profiles with gaps and projections, in the exemplary embodiment sets of rollers, are arranged on the rolling element or roller carrier 5 and correspond in number to the internal profiles or internal tooth systems of the rings 1 and 4. It is apparent in the light of FIGS. 1, 3 and 9 that on the basis of each of the two rings having two internal profiles, altogether four axially adjacent complementary profiles or sets of rollers are to be provided. These gaps and projections are in each case mutually offset in the circumferential direction according to the offset of the internal profiles or internal tooth systems on the rings. This has the result that, in accordance with FIGS. 2 and 4, the projection—in the exemplary embodiment one of the rollers—belonging to the rolling element or roller carrier 5 and engaging the one internal profile or internal tooth system of a ring is applied in the forward direction and the projection simultaneously engaging the adjacent internal profile or internal tooth system of the same ring is applied in the opposite direction, and as the rolling element rolls the engagement of the projections thereof alternates continuously. In FIGS. 2 and 4 one sees rollers 3.3 in engagement with an internal tooth system 4.1 of the rotatable ring 4. At the same time one sees that in the circumferential direction the second internal profile 4.2 of this ring 4 is offset relative to the internal profile 4.1 by half the pitch, so that the rollers 3.4 seated on correspondingly offset axes engage this internal profile 4.2 accordingly and can move on rolling contact as the roller carrier 5 revolves.

The corresponding occurs at the fixed ring 1 and its internal profiles 1.1 and 1.2, these again being arranged in two parallel planes and being mutually offset and co-operating with rollers 3.1 and 3.2 in correspondingly offset planes on the roller carrier 5 in the manner described.

The rolling element is hence a rotatably mounted roller carrier 5 circumferentially provided with individual, rotatable rollers 3.1, 3.2, 3.3 and 3.4 which serve as projections for engagement with the internal tooth systems 1.1, 1.2 and 4.1, 4.2 of the rings 1 and 4 and are located in correspondingly arranged, axially adjacent planes. The individual rollers on the roller carrier 5 are offset in the circumferential direction on the roller carrier 5 according to the offset of the internal profiles or internal tooth systems on the rings 1 and 4 and are arranged in such a way that suitably arranged rollers simultaneously co-operate with each internal profile or internal tooth system of the rings 1 and 4 and mesh therewith as mating teeth. The roller engaging the one internal profile of a ring engages in the forward direction and the roller simultaneously engaging the adjacent, internal profile of the same ring engages the respective tooth in the opposite direction and therefore zero backlash is compulsory. As the roller carrier 5 rotates and revolves it moves on rolling contact with the engagement of the rollers alternating continuously, because they roll on the inner contours between the teeth. FIGS. 2 and 4 show that one of the rollers 3.3 co-operating with the internal profile 4.1 has just reached the lowest point between two teeth, while the neighbouring roller engages near the tooth crest at the opposite side. The rollers of the next-lower plane, which provide for the compulsory zero backlash mentioned, are correspondingly offset. The internal profile or internal tooth system between the individual teeth hence has an arcuate contour with a smooth transition to the tooth surfaces, so that during the revolution of the roller carrier 5 the rollers continuously roll in the space between two teeth of the internal profile of the ring, the rollers simultaneously engaging the internal tooth systems or internal profiles of the respective ring 1 or 4 being offset in the circumferential direction in such a way that the engagement is in each case compulsorily free from backlash.

For each internal profile or internal tooth system 1.1, 1.2 and 4.1, 4.2, four equi-circumferential rollers 3.1 to 3.4 are provided on the roller carrier(s) 5 and are offset in the manner already mentioned, so that in the exemplary embodiment one roller carrier 5 has altogether sixteen rollers. More than four rollers per set of rollers might be provided, e.g. if the roller carrier 5 is to have a larger circumference and/or forces of greater magnitude are to be transmitted.

According to FIGS. 2, 4 and 9, in each case two diametrally opposed, rotatably mounted roller carriers 5 of identical size and shape are provided on the arms 5.1 and 5.2. This produces a favourable force distribution.

Hence altogether four, axially adjacent sets of rollers with rollers 3.1, 3.2, 3.3 and 3.4 are provided on the roller carrier 5, wherein the rollers meshing with an internal profile or internal tooth system are equi-circumferential. On the one hand the rollers 3.1 and 3.2 mutually offset in the circumferential direction are provided for co-operating with the ring 1 and on the other hand the rollers 3.3 and 3.4 are provided for co-operating with the rotatable ring 4. The rollers 3.1 and 3.3 on the one hand and the rollers 3.2 and 3.4 on the other hand are in each case arranged coaxially and have a corresponding offset in the circumferential direction of the roller carrier 5. Therefore the zero backlash at the two rings 1 and 4 is compulsory.

The roller carriers 5 having rollers 3.1 to 3.4 rotate about a continuous axis 5.3 permanently fixed at both ends in arms 5.1 and 5.2. The axis 5.3 carrying the offset rollers is hence provided continuously in the axial direction on the roller carrier 5 and is supported at either end. The roller carrier 5 is provided with arms situated between the individual rollers 3.1 to 3.4, separating and axially locating them. FIG. 9 shows that the rollers 3.1 to 3.4 are composed by the outer races of roller bearings which in turn are mounted on corresponding pins which run parallel to axis 5.3 and are arranged in the arms.

If the rotatable ring 4, as a rule the output ring, is provided or formed with more profiles or teeth than the ring 1, a revolution of the roller carrier 5 along the inner side of the ring 1 brings about an incomplete rotation of this ring 4, e.g. the output ring, the difference amounting to the number of profiles or teeth.

If the ring 4 is formed for instance with less teeth or profiles, e.g. with two teeth less than the fixed ring 1, it advances relative to the fixed ring 1 during a revolution of the roller carrier 5.

If ring 4 and ring 1 are formed with the same number of identical profiles or tooth systems and numbers of teeth, there is no relative movement between the two rings 1 and 4. Hence, for the area in which the profile is the same as that of the fixed ring 1, the output ring 4 locks into place. If a section of the internal circumference of the output ring 4 is formed with a profile identical to that of a corresponding area of the fixed ring 1, e.g. for operation with two roller carriers 5 according to FIG. 1 an area extending over 90° or a quarter of the cirumference, and if the remaining, opposite areas of likewise about a quarter of the circumference or 90° are provided with more teeth on the rotatable ring or output ring 4, a stepping movement results, the direction of rotation of which is determined by the number of teeth. If, in the area where the number of teeth differs, the rotatable ring has a smaller number of teeth than the fixed ring 1, a backward turn results.

The transitions between the locking phase mentioned and the movement phase can be formed by transmission functions known per se, in such a way that e.g. over a range of 15° the acceleration and/or speed coefficient change from zero to a maximum and back to zero. Hence, if one area has more and another area has less teeth than the corresponding area of the fixed ring 1, a reciprocating rotary motion can be generated at the output ring 4 during a revolution of the roller carrier 5.

For a continuous drive movement introduced at the drive or shaft 2, a start-stop-forward and/or backward movement or an oscillatory movement is therefore obtained at the ring 4.

The rotatably mounted ring 4 may be connected to an output shaft 102 arranged in alignment with the input shaft 2, such connection being established by way of a disc 101 which is connected to the end face (FIG. 1) or exterior of said ring and may be of cup-shaped or bell-shaped configuration. This arrangement with such a disc 101 for transmitting the rotary motions of the ring 4 is to be seen in FIGS. 1, 3 and 9.

It follows from the foregoing description that there is a considerable difference in speed between shaft 2 and shaft 102, i.e. the very high speed of the shaft 2 is heavily reduced by the gear 101 at the shaft 102. Drive and output could be interchanged for a speed increase, i.e. shaft 102 could be coupled to a drive, so that an output is then connected to shaft 2. In this case a considerably higher speed could be made from a given speed. This is possible because by virtue of the above-described features and measures the gear operates smoothly and free from backlash and has a high efficiency without irreversibility. It is also advantageous in this connection that the roller carriers 5 and the internally profiled rings 1 and 4 in each case have axially adjacent and circumferentially offset profile planes, and in each roller plane at least one roller engages each ring 1 and 4, i.e. least two rollers are simultaneously in engagement with a ring and produce a momentary form-fit.

According to FIG. 4, the shaft 2 rotatable with the roller carrier(s) 5 has an external profile or carries such in the form of a star wheel or gearwheel with profiles 2.1 and 2.2 which are offset in corresponding planes and in each case produce a momentary form-fit with a roller 3.1 to 3.4. The embodiment according to FIGS. 3 and 4 is hence suited for incorporating a further step-up or step-down in the gear 100.

Figure 3:
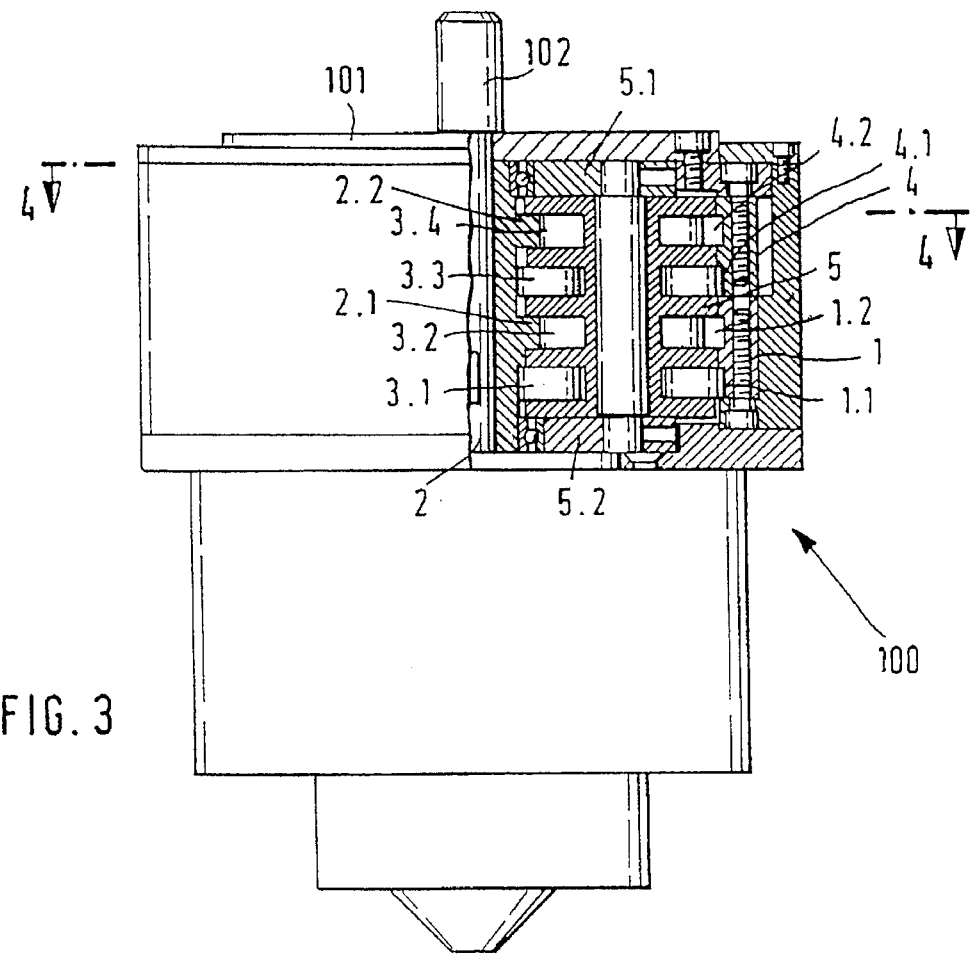
FIG. 3 is a representation corresponding to that of FIG. 1 of a modified epicyclic roller gear in which the drive shaft has a central rotary body as drive element, said rotary body having an external profile or external tooth system and acting upon the rollers of the roller carrier on the side opposite the engagement of said roller carrier with the internally profiled rings.
Figure 4:
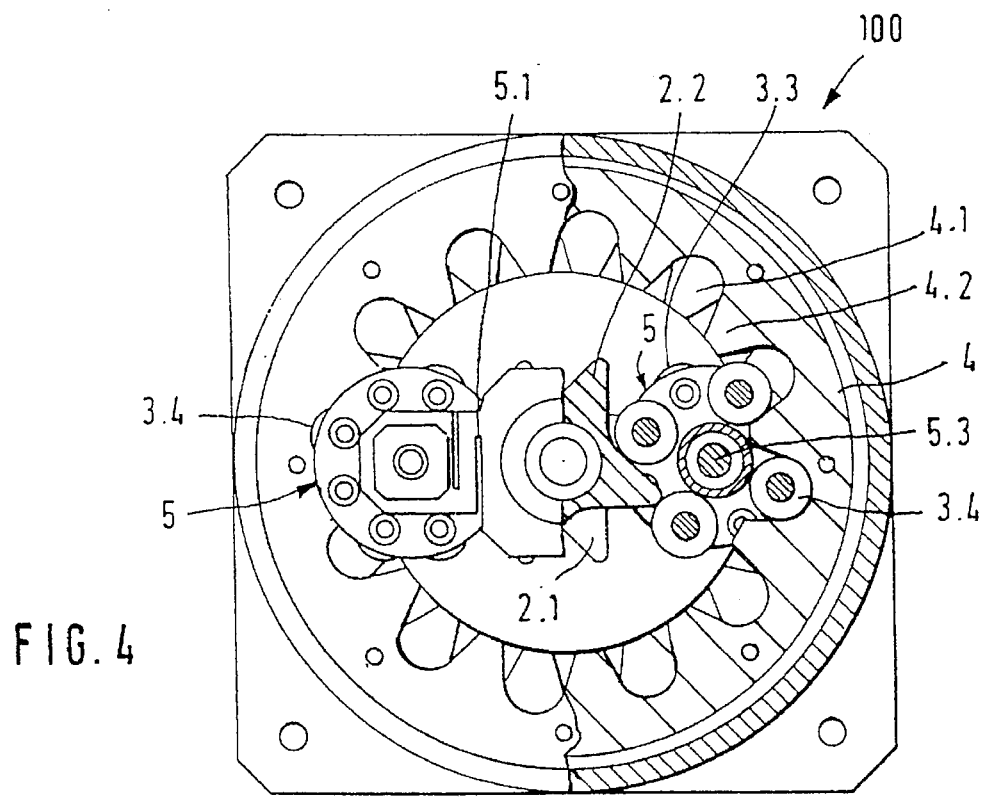
FIG. 4 is a cross section through the epicyclic roller gear on line 4—4 of FIG. 3 with two different sectional planes.

FIGS. 3 and 4 show that on that side of the roller carriers 5 which is located in the centre of and is opposed to the rings 1 and 4 and internal profile thereof, said roller carriers 5 mesh with a rotary body which has the external profile 2.1 and 2.2 etc. and is non-rotatably or possibly integrally connected to the input shaft. The rotary body has the plurality of toothed rims already mentioned, the teeth of which situated in axially adjacent planes are mutually offset in the circumferential direction by the amount to which the individual rollers 3.1 to 3.4 and the teeth of the internal profile of rings 1 and 4 are offset in the circumferential direction. Therefore the same contact ratios with the rollers of the rolling element 5 result at this external profile 2.1, 2.2 etc. as well.

Mention was already made that the number of teeth and/or the shape of the teeth in the circumferential direction of at least one of the two rings 1 or 4 and/or of the central rotary body may change over a part of the circumference. Therefore more and/or differently shaped teeth are arranged in one section of the circumference than in one or several other sections. Together with appropriate transition areas, this leads to the already described, different rotary motions at the output, through which the gear 100 can be used as a step-by-step gear.

Figure 5:
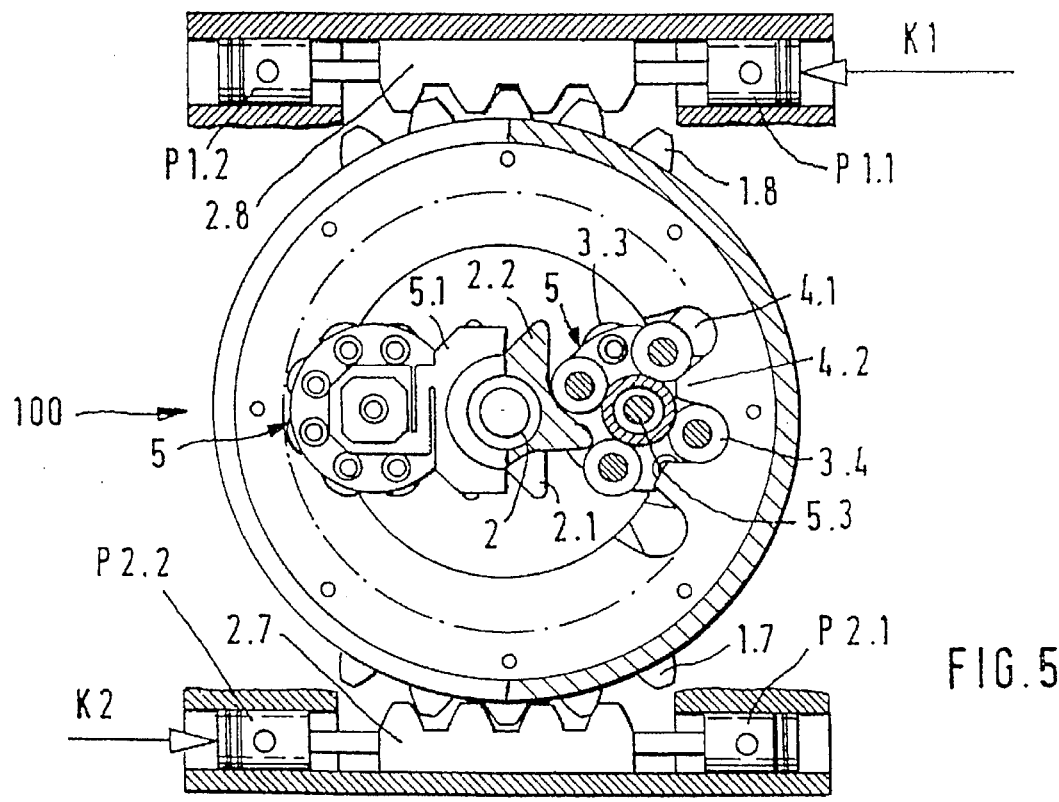
FIG. 5 is a cross section of a modified gear formed in such a way that at least one of the rings has different profiles and partial tooth systems in sections of the same plane, and two racks reciprocated by push or pull and one working cylinder each act upon the rotatable ring at an external tooth system.

The high efficiency of the gear 100 enables developments which can be used, in accordance with FIG. 5, to introduce an oscillatory movement by means of forces K1 and K2 through pistons P1 and P2. These pistons belong to working cylinders illustrated diagrammatically in FIGS. 5 and 6. It is shown that a drive and/or output is adapted to be coupled to the exterior of the rotatable ring 4 and, according to FIG. 5, may consist of two toothed segments with teeth 1.7 and 1.8 which are situated at the outer circumference of the ring 4 and mesh with the racks 2.8. However the engagement of a gearwheel and a circumferential toothed rim would also be conceivable here, through which the entire gear 100 could be used as a stage in a gear.

Under the action of forces K1 and K2, a rotary motion is obtained at the shaft 2 via racks 2.8 and tooth systems 1.7 and 1.8. It is contemplated that the profile or tooth system of the rings 1 and 4 and/or of the central rotary body have changing numbers of teeth in the circumferential direction, so in the above-described manner the rotatable ring performs an oscillatory movement when the shaft 2 performs a uniform rotary motion. If this principle is reversed and the ring 4 is driven for oscillation, the reciprocations can hence be converted into a rotary motion.

Figure 6:
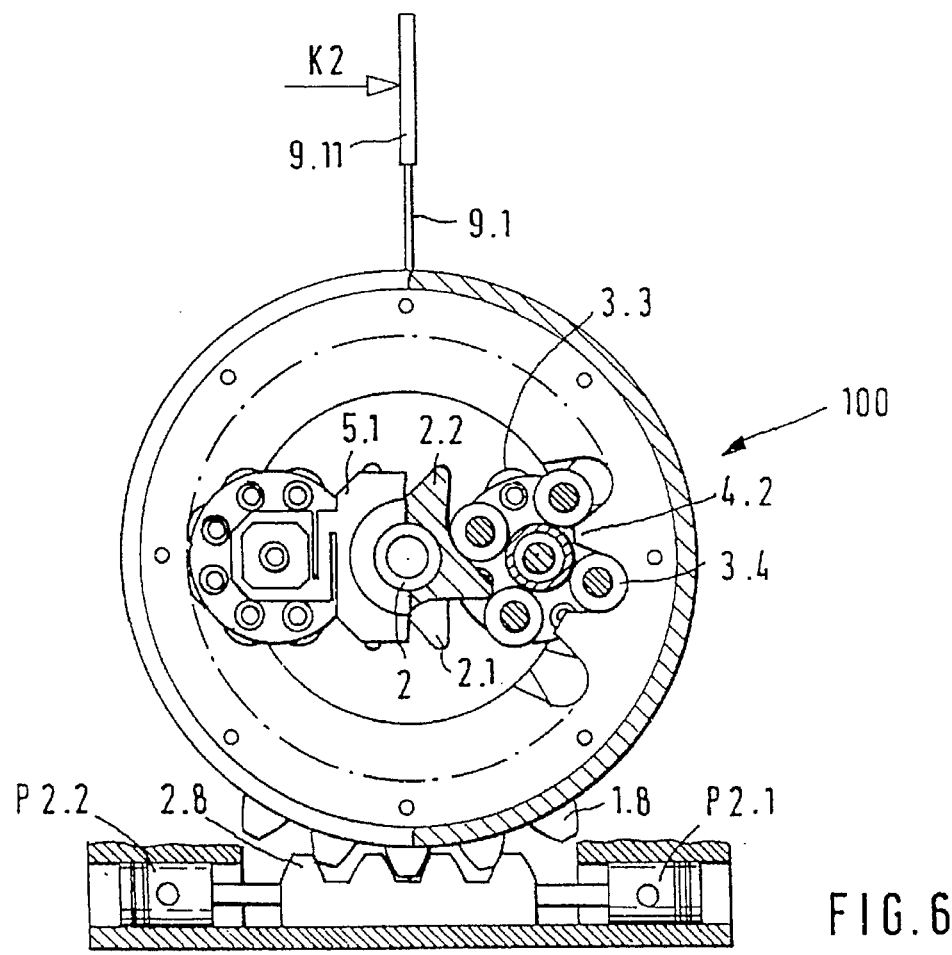
FIG. 6 is a cross section of a gear with a profiled ring with partial tooth systems, two working cylinders acting on a rack and an external tooth system and an arm which is rigidly connected to the ring and acts upon the ring diametrally opposite the tooth system.

In FIG. 6 a lever arm 9.1 acts on the outer circumference of the ring 4 and also the tooth system 1.8 engages with a rack 2.8. The force K2 is transmitted at a vane 9.11 via the lever arm 9.1 to the rotatable ring 4 of the gear 100. The force K2 may be one of fluid flow, e.g. wind power, and if the vane is twistable can be utilized for converting reciprocations at the ring 4 into a rotary motion at the shaft 2.

Figure 7:
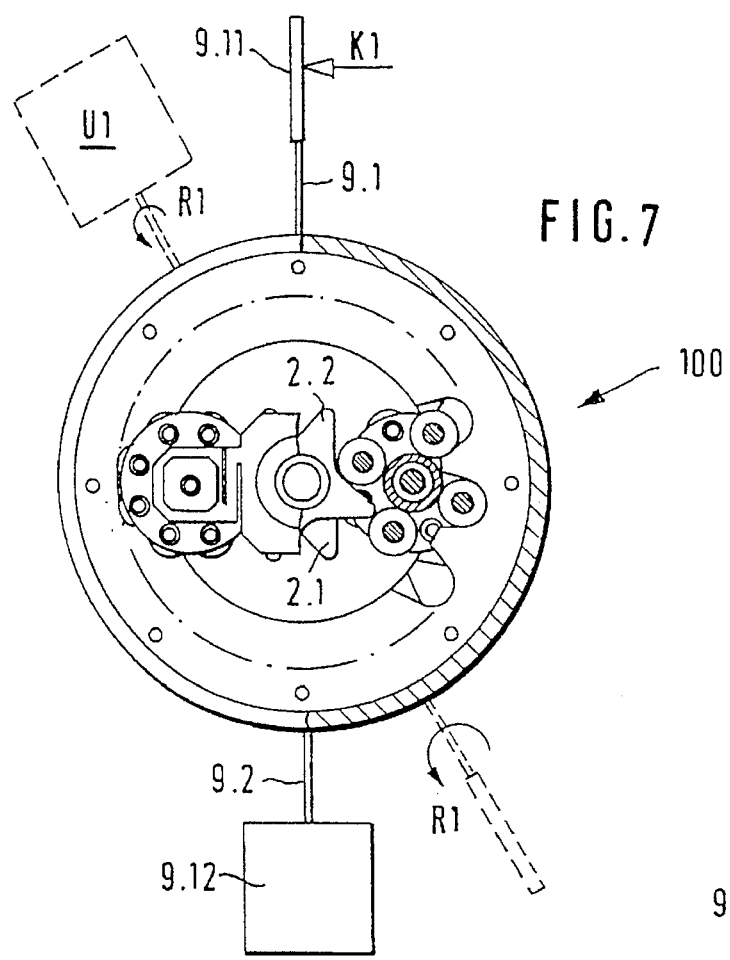
FIGS. 7 and 8 are an epicyclic roller gear having a profiled ring with partial tooth systems and at least two diametrally opposite, rigid arms provided with planiform vanes rotatably mounted in turning points determined by the gear design.
Figure 8:
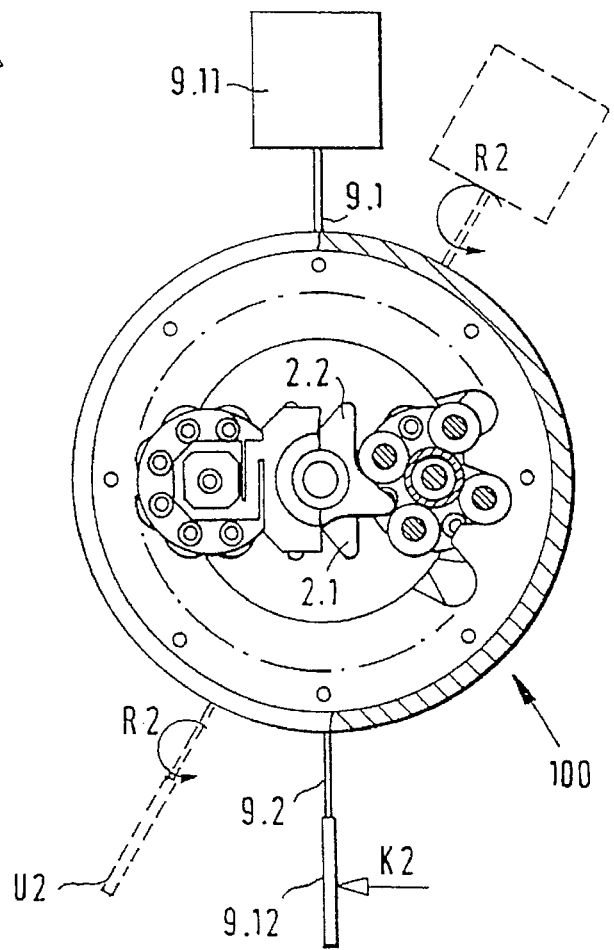

In the exemplary embodiment according to FIGS. 7 and 8, diametrally opposed lever arms 9.1 and 9.2 with vanes 9.11 and 9.12 are provided. The vanes are mounted for rotation about an axis situated on a diameter or extension thereof, so that in the one direction they are arranged with their face crosswise to the diametral plane of the ring 4 and after a turning point they are arranged approximately in that plane. Given a constant application of force, this leads to an oscillatory movement of the ring 4, resulting in a rotary motion in a single direction at the shaft 2 on account of the profiles at the inner toothed rims co-operating with the rollers of the roller carrier 5. The planiform vanes 9.11 and 9.12 are devised in such a way that a lock R1 is released in the turning points or points of reversal, through which the vanes 9.11 and 9.12 are turned through 90° as is indicated in FIGS. 7 and 8. Given the same wind direction, this results in the reversal of motion at the drive and hence a rotary motion in the same direction at the respective output.

Since the gear 100 is compulsorily free from backlash through the mutually offset internal profiles at the inner side of its rings 1 and 4 and the rollers of the roller carrier 5 co-operating therewith, such oscillatory movements can be utilized with good efficiency for corresponding step movements or for converting reciprocations into rotary motions. At the same time a high contact ratio is possible between the transmitting elements, hence the rollers and rings, while the radial dimension is altogether relatively small, enabling a compact design to be achieved.

The epicyclic roller gear 100 has two rings 1 and 4 provided with an internal profile. One ring 1 is fixed and the other ring 4 is parallel or coaxial to the first ring 1 and is rotatably mounted with respect thereto. The number of teeth on the two rings is different. Both rings 1 and 4 have at least two parallel internal profiles 1.1, 1.2, 4.1 and 4.2, which are offset in the circumferential direction by a fraction of the pitch of the profile or teeth. When each ring has two mutually offset internal profiles, they are mutually offset by half the pitch of the teeth, so that in this case the gaps of the one tooth system are occupied by the teeth of the second adjacent tooth system. This results in a high contact ratio with the corresponding complementary profiles of a rolling element, preferably a roller carrier 5 with rotatable rollers which roll in the gaps between the teeth of the internal profiles. Because the rings have a different number of teeth, there results a relative rotation during each revolution of the rolling element. By providing sections having a different number of teeth and/or teeth of different shapes in the circumferential direction, the output speed can be varied, and if required the output may even be stopped for a short time or its direction of rotation may be reversed. This in turn may be used to convert, through the gear 100, a reciprocal movement acting on such a ring into a rotary motion in a single direction.

We claim:

1. An epicyclic roller gear (100) comprising first and second rings (1, 4), each ring having an inner side with an internal profile having teeth, wherein the first ring (1) is fixed and the second ring (4) is coaxial to the first ring (1) and is rotatably mounted with respect thereto, the number of internal teeth on the first and second rings (1, 4) is different, at least one rotatable rolling element (5) which is capable of rolling on the toothed inner sides of the first and second rings (1, 4) and having alternate external gaps and projections which mesh with the internal profile of both rings, said rolling element (5) being engaged with the internal profiles of the rings, wherein the rolling element is rotatably mounted on an arm (5.1, 5.2) which is rotatable about an axis of the rings (1, 4) to drive the rolling element in a circumferential direction along the inner sides of the rings (1, 4) so that, based on the different numbers of teeth on the inner side of each of the two rings (1, 4), the rotatable ring (4) is movable relative to the fixed ring (1), characterized in that the internal profile on each of the two rings (1, 4) includes at least two internal tooth systems (1.1, 1.2; 4.1, 4.2) which are disposed parallel to each other and are offset in the circumferential direction by a fraction of the pitch of the teeth, wherein the internal tooth systems within each ring have the same profile and pitch, and the internal tooth systems of the two rings differ from one another, the alternate external gaps and projections of the rolling element including a plurality of axially adjacent external gaps and projections which are complementary to the internal tooth systems of the rings (1, 4), said complementary gaps and projections being mutually offset in the circumferential direction according to the offset of the internal tooth systems on the rings, each projection of the rolling element engages one internal tooth system of one of the first and second rings and is applied in a forward direction and an axially adjacent projection simultaneously engages the adjacent internal tooth system of the same ring and is applied in an opposite direction, and as the rolling element rolls this engagement of the axially adjacent projections thereof alternates continuously.

2. An epicyclic roller gear as claimed in claim 1, characterized in that the tooth systems in each ring are mutually offset in the circumferential direction by half the pitch of the teeth.

3. An epicyclic roller gear as claimed in claim 1, characterized in that the rolling element is a rotatably mounted roller carrier (5) circumferentially provided with individual rotatable rollers (3.1 to 3.4) as projections for engagement with the internal tooth systems of the rings (1, 4), the individual rollers on the roller carrier (5) being offset in the circumferential direction on the roller carrier (5) according to the offset of the internal tooth systems on the rings (1, 4) and being arranged in such a way that suitably arranged rollers mesh with each internal tooth system of the rings (1, 4), and that the roller engaging one internal tooth system of one of the first and second rings is applied in the forward direction and the roller simultaneously engaging the adjacent internal tooth system of the same ring is applied in the opposite direction, and as the roller carrier (5) rotates and revolves, the rollers move in rolling contact in such a way that the engagement of the rollers with the tooth systems of the one of the first and second rings alternates continuously.

4. An epicyclic roller gear as claimed in claim 3, characterized in that the internal tooth systems of each ring include individual teeth having surfaces and spaces between the individual teeth, the spaces having an arcuate contour with a smooth transition to the tooth surfaces, and during the revolution of the roller carrier (5) the rollers (3.1 to 3.4) roll continuously across the teeth and in the space between the teeth.

5. An epicyclic roller gear as claimed in claim 3, characterized in that the roller carrier includes at least two equi-circumferentially spaced rollers for each internal tooth system.

6. An epicyclic roller gear as claimed in claim 3, characterized in that the arm is provided with at least two, equally spaced, rotatably mounted roller carriers of identical size and shape.

7. An epicyclic roller gear as claimed in claim 3, characterized in that the roller carrier is provided with four axially adjacent sets of rollers, wherein the rollers meshing with the internal tooth system are equi-circumferential, a first set of the rollers being mutually offset in the circumferential direction from a second set of rollers for cooperating with one of the first and second rings, and a third set of rollers being mutually offset in the circumferential direction from a fourth set of rollers for cooperating with the other of the first and second rings.

8. An epicyclic roller gear as claimed in claim 3, characterized in that the rollers which are arranged at a corresponding location on the circumference of the roller carrier and serve for cooperating with in each case one tooth system of the two rings are arranged on a continuous axis, and all the rollers which are mutually offset in the circumferential direction are arranged on continuous axes on the roller carrier.

9. An epicyclic roller gear as claimed in claim 3, characterized in that the rings (1, 4) each have at least two adjacent profile planes on which the tooth systems are located, and the roller carrier (5) has at least four axially spaced roller planes rotatable about a shaft (2) located along the axis of the rings, and the tooth systems (1.1, 1.2; 4.1, 4.2) of the rings (1, 4) have a form which produces a momentary form-fit with at least one roller (3.1, 3.2, 3.3, 3.4), at least two rollers being located on each roller plane.

10. An epicyclic roller gear as claimed in claim 3, characterized in that external profiles are connected to an input shaft located along the axis of the rings, the external profiles being formed in such a way that each external profile produces a momentary form-fit with one roller of the roller carrier.

11. An epicyclic roller gear as claimed in claim 3, characterized in that on a side of the roller carrier (5) which is opposite to the engagement area between the rollers and the internal tooth systems of the rings (1, 4), said roller carrier meshes with a central rotary body having an external profile, the central rotary body being non-rotatably connected to an input shaft (2) located along the axis of the rings and having a plurality of parallel toothed rims, with axially adjacent teeth thereof being mutually offset in the circumferential direction by an amount which equals the spacing between rollers (3.1 to 3.4).

12. An epicyclic roller gear as claimed in claim 11, characterized in that the pitch of the teeth in the circumferential direction of at least one of the two rings (1, 4) and the central rotary body changes over part of the circumference, so that more teeth are arranged in one section of the circumference than in at least one other section.

13. An epicyclic roller gear as claimed in claim 11, characterized in that the teeth in the axially adjacent planes on one of the central rotary body and the rings are formed in such a way as to have different profiles in at least one circumferential section.

14. An epicyclic roller gear as claimed in claim 11, characterized in that the tooth system of at least one of the rings and the central rotary body have a form in which the teeth of at least one of the rings and the rotary body have the same profile in certain circumferential areas of different planes.

15. An epicyclic roller gear as claimed in claim 11, characterized in that the pitch of the teeth in the circumferential direction of at least one of the two rings and the central rotary body changes over part of the circumferences, and between circumferential areas of at least one of the rings and the central rotary body having different numbers of teeth, the teeth and their spacing have a form enabling a shock-free transition of the relative rotation, in that a transmission function of the transitions between the different profiles of the same plane have at least in a first derivative a value differing from zero.

16. An epicyclic roller gear as claimed in claim 3, characterized in that at least one shaft (5.3) is provided for the rotatable mounting of the roller carrier on the arm.

17. An epicyclic roller gear as claimed in claim 1, characterized in that the projections simultaneously engaging the internal tooth systems of the respective rings are offset in such a way that engagement of the rolling element with each respective ring is free from backlash.

18. An epicyclic roller gear as claimed in claim 1, characterized in that the rolling element is connected to an input shaft and the rotatably mounted ring is connected to an output shaft (102) arranged in alignment with the input shaft (2).

19. An epicyclic roller gear as claimed in claim 1, characterized in that the rolling element is connected to an output shaft and the rotatably mounted ring is connected to an input shaft to achieve an increased output speed.

20. An epicyclic roller gear as claimed in claim 1, characterized in that one of a drive and an output is coupled to the exterior of the rotatable ring (4).

21. An epicyclic roller gear as claimed in claim 1, characterized in that at least one of a lever arm (9.1) for application of a force and a tooth system for co-operating with a complementary tooth system on one of a gearwheel and a rack is arranged on the outside of the rotatable ring (4).

22. An epicyclic roller gear as claimed in claim 1, wherein a tooth system for co-operating with a complementary tooth system on one of a gearwheel and a rack is arranged on the outside of the rotatable ring (4) and at least one working cylinder is provided for acting on the external tooth system of the rotatable ring and on the one of the gearwheel and the rack.

23. An epicyclic roller gear as claimed in claim 1, characterized in that at least one lever arm is rigidly connected to the rotatable ring, and vanes having faces are mounted on the at least one lever arm for rotation about an axis arranged approximately in radial relationship to the rings, and in one direction said vanes are arranged with their faces crosswise to the diametral plane of the ring (4) and after a turning point they are arranged approximately in that plane.

* * * * *